United States Patent [19]
Disselbeck et al.

[11] 4,389,447
[45] Jun. 21, 1983

[54] DIMENSIONALLY STABLE COMPOSITE MATERIAL AND PROCESS FOR THE MANUFACTURE THEREOF

[75] Inventors: Dieter Disselbeck, Bad Soden am Taunus; Dieter Stahl, Kriftel, both of Fed. Rep. of Germany

[73] Assignee: Hoechst Aktiengesellschaft, Frankfurt am Main, Fed. Rep. of Germany

[21] Appl. No.: 338,856

[22] Filed: Jan. 12, 1982

[30] Foreign Application Priority Data

Jan. 15, 1981 [DE] Fed. Rep. of Germany ....... 3101022

[51] Int. Cl.³ .............................................. B32B 3/12
[52] U.S. Cl. .................................... 428/178; 156/148; 156/179; 156/243; 156/307.3; 156/324; 428/187; 428/223; 428/224; 428/246; 428/251; 428/252; 428/257; 428/284; 428/408
[58] Field of Search ................... 428/86, 93, 178, 120, 428/187, 221, 223, 224, 225, 257, 251, 252, 408; 156/148, 179, 307.3, 324, 243

[56] References Cited

U.S. PATENT DOCUMENTS 2,841,515  7/1958  Runton ................................ 428/223
3,481,427 12/1969  Dobbs et al. .
3,943,980  3/1976  Rheaume ............................. 428/178
3,966,013  6/1976  Hatch et al. ........................ 428/225
3,969,563  7/1976  Hollis ................................. 428/178

FOREIGN PATENT DOCUMENTS 2143982  3/1973  Fed. Rep. of Germany .
2855194  6/1980  Fed. Rep. of Germany .

*Primary Examiner*—James J. Bell
*Attorney, Agent, or Firm*—Curtis, Morris & Safford

[57] ABSTRACT

The dimensionally stable composite material consists of a double fabric with spacer filaments. On both sides of the double fabric there is a plastics layers. Face and back fabric of the double fabric are linked with each other by means of incorporated rigid filaments which prevent the double fabric to be squeezed. The exterior plastics layers are curable laminates. FIG. 1 shows such a composite material.

The material is obtained by applying fiber mats impregnated with curable synthetic resins to both sides of the double fabric containing spacer filaments, and subsequently bonding fiber mats and double fabric by compression.

8 Claims, 2 Drawing Figures

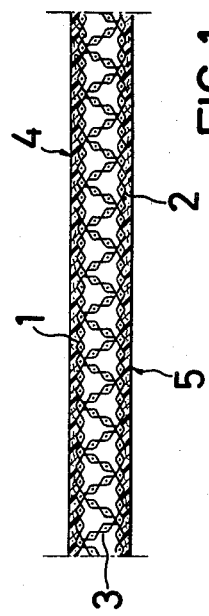
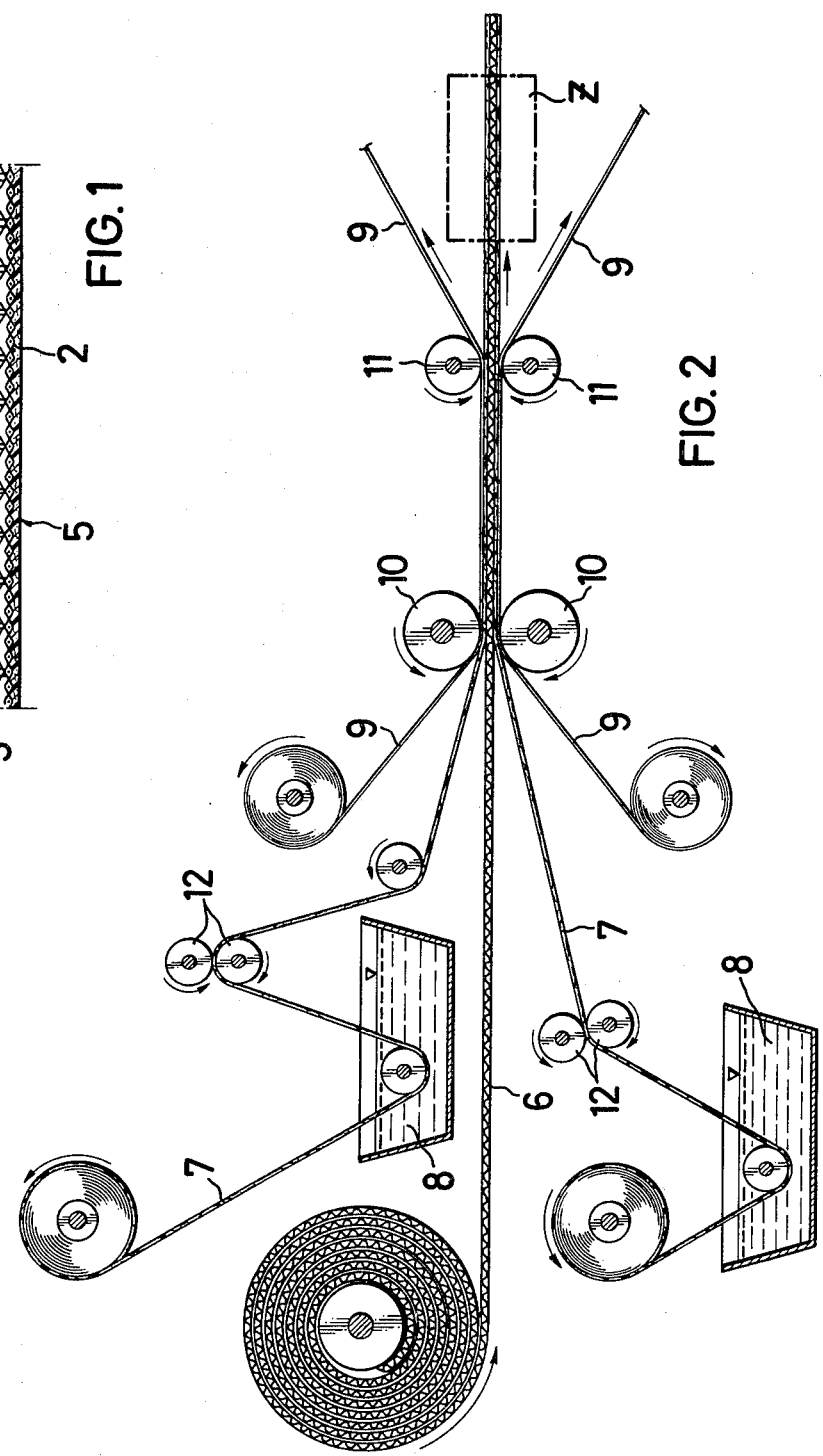

DIMENSIONALLY STABLE COMPOSITE MATERIAL AND PROCESS FOR THE MANUFACTURE THEREOF

This invention relates to a dimensionally stable composite material consisting substantially of a double fabric containing spacer filaments, which is provided on both sides with a plastics layer, and a process for the manufacture thereof.

As building elements of high strength and low weight the shape of which is of secondary importance only, composite fiber-reinforced plastic materials are successfully used to an increasing extent. These composite materials consist usually of several layers of a core material uch as fiber mats, rigid foam, cork, aluminum, plastic or cardboard honeycombs, and a cured synthetic resin. They are manufactured batchwise according to known methods either manually or by mechanical hot or cold molding in which processes the individual components, for example fiber mats, aluminum honeycomb core and curable resin are placed in layers in the mold, and the bond of these individual layers with one another is ensured by slight compression.

It is important to remove completely the close air between the individual layers, since otherwise the adhesive bond between these layes is not ensured and the strength of the building element is adversely affected. Close air furthermore has a negative influence on the stability to light, the long-term behavior and the appearance of the building element.

At elevated compression for removing the air and intensifying the adhesive bond there is the risk of damaging the core material and adversely affecting the mechanical properties of the building element. Moreover, the known core materials have the disadvantage of nearly not being tri-dimensionally ductile, and thus the manufacture of articles of complicated shape in sandwich design is not feasible in one compression operation. The tensions occurring due to varying coefficients of expansion of the different materials and the differing shrinkage behavior cause alterations of the geometric shape, for example the so-called "dish"-formation.

In German Offenlegungsschrift No. 1,535,736, filler slabs are described which consist of double fabrics the face and back fabric of which are linked by means of an interlayer fabric. Face, back, and interlayer fabric are flexible. The fabrics may be coated with resin, solidified by the action of heat and pressure, and then serve for the manufacture of filler slabs, or shaped radar components can be directly manufactured therefrom. Furthermore, the interspace between the face and back fabric can be filled particularly or completely with plastic foam or similar material.

These known composite materials likewise have the disadvantage of insufficient resistance of the links between face and back fabric with respect to pressure strain, and of difficulty for the air to escape from the interspace during the coating and the setting of the resin.

It is therefore the object of the present invention to provide composite materials for lightweight building elements in sandwich design which are free from the above disadvantages and can be manufactured without problems, even continuously.

This object is achieved in accordance with the invention by providing a dimensionally stable composite material, wherein the face and back fabrics of the double fabric are linked with each other by means of incorporated rigid filaments which prevent the face and back fabric to be squeezed together, and the face and back fabrics are coated with a cured laminate. The rigid filaments are preferably monofilaments, and preferably, face and back fabric as well as the rigid filaments are made from polyesters, polyamides, glass, carbon and/or metals. According to a further preferred embodiment of the invention, the laminate consists of one or more fiber mats impregnated with synthetic resin. Advantageously, the exterior fiber mat has a decorative surface.

The dimensionally stable composite material of the invention is obtained according to a process which comprises joining on both sides the double fabric the face and back of which are linked with each other by means of incorporated rigid filaments and which serves as core material with one or more fiber mats impregnated with synthetic resin, and bonding then the double fabric to the fiber mats by compression. It is advatageous to provide for a separating sheet on the outer faces of the fiber mats. The pressure is preferably produced by means of a pair of rollers through the gap of which double fabric and fiber mats are passed. Furthermore, it is recommended to impregnate first the double fabric with a solution of synthetic resin, to mold it in hot state, and to provide it then on both sides with curable layers which are subsequently cured.

The double fabrics used for the manufacture of the dimensionally stable composite material according to the invention and the manufacture thereof are state of the art. In accordance with the invention it is essential that rigid filaments are used as spacer filaments, that is, those which ensure a sufficient resistance to pressure, so that the face and back fabric cannot be squeezed, under the usual strain of processing for example. As spacer filaments, rigid multifilaments, preferably, however, monofilaments, are used. These filaments are contained in the double fabric as spacers either individually or in woven form; they are incorporated by weaving and thus linked to the face fabric as well as to the back fabric.

The laminate on the face and back side each of the spacer-containing double fabric consists preferably of one or more fiber mats impregnated with a synthetic resin, preferably a duromeric resin such as a unsaturated polyester, epoxy, methacrylate, melamine or furan resin. The laminate may contain alternatively a printed or structural non-woven material in order to obtain a special fancy appearance.

According to a further embodiment, the layers of synthetic resin are directly bonded to the face and back side of the spacer-containing double fabric, that is, without fiber reinforcement.

Face and back fabric and the rigid filaments are made preferably from polyesters, polyamides, glass, carbon or even metal.

As exterior fiber mat, all textile flat structures such as woven and knitted fabrics or non-wovens may be used. If desired for the dimensionally stable composite material, the exterior fiber mat may be provided with a decorative surface, for example a dyeing etc . . .

As described above, the dimensionally stable composite material of the invention on the basis of a double fabric containing spacer filaments is obtained according to a process which comprises joining on both sides the double fabric the face and back of which are linked with each other by means of incorporated rigid filaments and which serves as core material with at least one fiber mat impregnated with synthetic resin, and bonding then the double fabric to the fiber mat by compression. This process is carried out especially with the aid of separating sheets which are applied to the double fabric simultaneously with the fiber mats on the outer faces thereof. Thus, the composite material has a particularly smooth surface and comes off without difficulty from the pressing means producing the bond of the double fabric to the fiber mats, that is, the rollers. Especially preferred is a process variant according to which the double fabric is first impregnated with a solution of a synthetic resin, then molded in hot state, and thereafter provided on both sides with curable layers which are then cured. This variant allows the obtention of dimensionally stable composite materials of any three dimensional shape.

The composite material of the invention is torsion-proof, because the spacer filament-containing double fabric has the function of a lattice girder. Face and back fabric as web bracing absorb tensions occurring in any direction especially due to varying coefficients of expansion and differing shrinkage behavior.

An essential technical progress resides in the fact that in the manufacture of the composite materials of the invention the air is not locked between fabric and laminate, but is driven off through the interspace formed by the face and back of the double fabric. Thus, expensive vacuum manufacturing processes can be omitted and continuous manufacture of slab-shaped or profiled composite materials is made possible.

The composite material so obtained has a perfect, brilliant surface and is suitable for application as lightweight building element, for example in the construction of motor vehicles, airplanes or boats. For buildings, translucent heat-insulating composite slabs (for example for lamp domes, greenhouses) can be supplied. For the manufacture of composite materials in sandwich design having a complicated shape, the spacer filament-containing double fabric being initially flexible is preferably impregnated with an aqueous phenol resin solution, subsequently molded in hot state, and the preform so obtained is provided with curable laminates.

BRIEF DESCRIPTION OF THE DRAWINGS

The invention will be better understood by reference to the accompanying drawing, wherein:

FIG. 1 is an enlarged view of section Z of FIG. 2 and shows the structure of the composite material.

FIG. 2 is a schematic view of the manufacture of the dimensionally stable composite material.

DETAILED DESCRIPTION OF A PREFERRED EMBODIMENT

With reference first to FIG. 1, an example of dimensionally stable composite material is formed of a face fabric 1 and a back fabric 2 separated from each other by spacer filaments 3. The latter are stiff and give dimensional stability to the composite structure during compression. An upper laminate 4 is bonded to the face fabric 1 while a lower laminate 5 is bonded to the back fabric 2.

As shown in FIG. 2, the composite material is formed by transporting a double fabric 6 (i.e., the face fabric, the back fabric 2, and the spacer filaments 3) and contacting the same under pressure with fiber mats 7, the latter forming the upper and lower laminates 4 and 5.

The upper and lower fiber mats 7 are first transported through respective baths 8 of synthetic resin and then are contacted with opposite sides of the double fabric 6. Separating sheets 9 are transported between outer sides of the fiber mats 7 and respective compression rollers 10 and transport rollers 11, and are thereafter removed, yielding and dimensionally stable composite material of FIG. 1. Squeeze-off rollers 12 are provided to remove excess synthetic resin from the fiber mats 7 in advance of the pressure rollers 10.

Of course, many other embodiments are possible without departing from the scope and spirit of this invention, as defined in the appended claims.

What is claimed is:

1. Dimensionally stable composite material consisting substantially of a double fabric having a face fabric and a back fabric linked to each other by rigid spacer filaments, and provided on outsides of both the face fabric and the back fabric with a plastics layer, wherein the filaments linking the face fabric and the back fabric of the double fabric are rigid monofilaments permitting the double fabric to withstand compressive forces substantially without deformation, and wherein said plastics layer is a cured laminate.

2. The dimensionally stable composite material as claimed in claims 1, wherein face and back fabric and the rigid filaments are made from polyesters, polyamides, glass, carbon, and/or metal.

3. The dimensionally stable composite material as claimed in claim 1 or claim 2, wherein the laminate consists substantially of one or more fiber mats impregnated with synthetic resin.

4. The dimensionally stable composite material as claimed in claim 3, wherein the exterior fiber mat has a decorative surface.

5. Process for the manufacture of a dimensionally stable composite material consisting substantially of a double fabric formed of a face fabric and a back fabric and containing spacer filaments linking said face and back fabrics, and provided on outsides of both the face fabric and the back fabric with a plastic layer, in which the spacer filaments are rigid filaments; which comprises joining on both outsides of the double fabric respective fiber mats impregnated with synthetic resin, the double fabric serving as core material for said impregnated fiber mats, and bonding the double fabric to the fiber mats by compression.

6. The process as claimed in claim 5, which comprises joining the double fabric simultaneously with the fiber mats with a separating sheet each of which is positioned on an outer face of an associated one of the fiber mats.

7. The process as claimed in claim 5 or claim 6, which comprises producing the compression by a pair of rollers together defining a gap between which the double fabric and the fiber mats are passed.

8. The process as claimed in claim 5 or claim 6, which further comprises impregnating first the double fabric with a solution of a synthetic resin, molding it subsequently and providing it then on both sides with curable layers which are cured thereafter.

* * * * *